United States Patent [19]

Kashima

[11] Patent Number: 4,568,121

[45] Date of Patent: Feb. 4, 1986

[54] ANGLE-ADJUSTABLE SADDLE

[75] Inventor: Tetsuo Kashima, Sakai, Japan

[73] Assignee: Kashima Saddle Manufacturing Co., Ltd., Osaka, Japan

[21] Appl. No.: 587,248

[22] Filed: Mar. 7, 1984

[30] Foreign Application Priority Data

Jun. 22, 1983 [JP] Japan ................................. 58-113547

[51] Int. Cl.[4] .............................................. B62J 1/00
[52] U.S. Cl. ..................................... 297/195; 403/82; 403/90
[58] Field of Search .................... 297/195; 403/82, 84, 403/87, 90

[56] References Cited

U.S. PATENT DOCUMENTS

| | | | |
|---|---|---|---|
| 1,578,634 | 3/1926 | Borgmann | 403/82 X |
| 2,452,316 | 10/1948 | Morley | 403/90 X |
| 3,066,978 | 12/1962 | Kalter | 297/195 |
| 3,476,496 | 11/1969 | Golden | 297/195 |
| 3,682,509 | 8/1972 | Worley | 297/195 |
| 4,155,590 | 5/1979 | Cunningham | 297/195 |

FOREIGN PATENT DOCUMENTS

| | | | |
|---|---|---|---|
| 73717 | 9/1949 | Denmark | 297/195 |
| 468948 | 4/1927 | Fed. Rep. of Germany | 403/90 |
| 2409182 | 7/1979 | France | 297/195 |
| 2436061 | 5/1980 | France | 297/195 |
| 2485463 | 12/1981 | France | 297/195 |
| 1375179 | 11/1974 | United Kingdom | 403/90 |

Primary Examiner—William E. Lyddane
Assistant Examiner—Peter A. Aschenbrenner
Attorney, Agent, or Firm—Pravel, Gambrell, Hewitt & Kimball

[57] ABSTRACT

An angle-adjustable saddle comprising a bearing portion secured directly to a saddle base and having a lower surface curved longitudinally of the base, a support portion provided at the upper end of a seat pillar and formed on its upper side a curved surface conforming to the curved surface of the bearing portion, a threaded rod for detachably fastening together the bearing portion and the support portion with the curved surfaces fitting to each other, and an internally threaded member having the threaded rod screwed therein, one of the bearing portion and the support portion being formed with a slot extending longitudinally the base.

3 Claims, 17 Drawing Figures

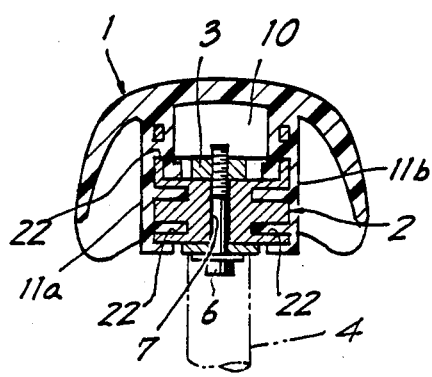
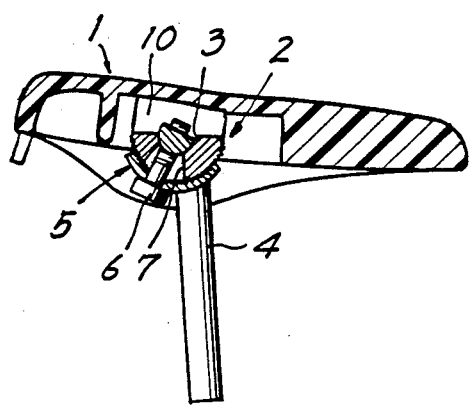
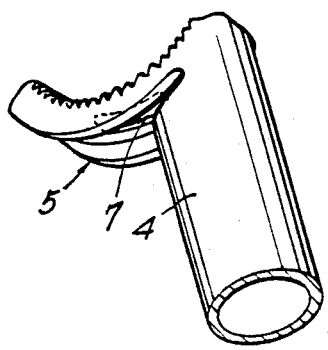
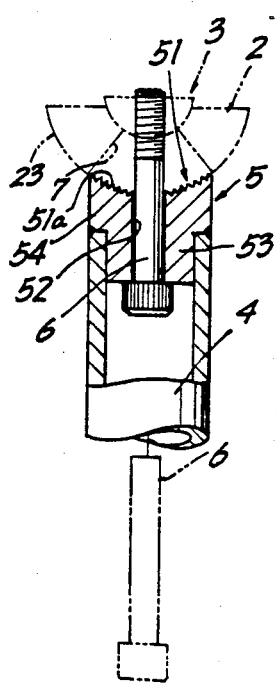
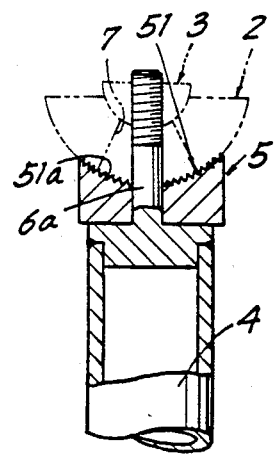

4,568,121

ANGLE-ADJUSTABLE SADDLE

TECHNICAL FIELD

The present invention relates to a saddle for vehicles which can be mounted at an adjustable angle.

BACKGROUND OF THE INVENTION

The saddle or seat for bicycles is mounted on the upper end of a seat pillar which is fitted to the seat tube of the bicycle frame and fixed thereto at an adjustable level. The angle of the seat tube may be slightly different from bicycle to bicycle according to the design, but it is required that the saddle be fixed in place at an adjusted angle so that the saddle top will be approximately horizontal irrespective of the angle of the seat tube and further that the saddle be angularly adjustable so as to incline the saddle top forwardly downward or upward as desired by the rider.

To fulfill this requirement, the seat pillar is usually provided at its upper end with a mounting device which comprises a loop clip, inner clip washers, outer clip washers, a clip bolt and nuts. With this type of mounting device, base wires attached to the saddle are clamped to fix the saddle at an adjustable angle.

However, the above device is composed of a large number of parts and is cumbersome to assemble. Further because the nuts screwed on opposite ends of the clip bolt are exposed, the nuts are likely to contact and injury the thighs of the rider.

Accordingly, another mounting device has been proposed which comprises a reduced number of parts and includes a nut which is not exposed outside as in U.S. Pat. No. 4,142,813.

In the case of this type of mounting device, the bolt head or the nut is not exposed from the sides thereof, so that the device is unlikely to injure the rider. Moreover, the device is composed of a reduced number of parts and is therefore simple to assemble.

The two conventional mounting devices described are both adapted to support the saddle by clamping the base wires of the saddle. Thus the saddle must invariably be provided with the base wires.

However, the provision of the base wires on the saddle requires an additional cost in view of the equipment and labor needed. Further, because the saddle, if having a large width, causes a thigh sore during a prolonged period of cycling, the saddle should preferably have a small width, but the reduction of the saddle width is limited by the presence of the base wires.

OBJECT OF THE INVENTION

The object of the present invention is to provide an angle-adjustable saddle which is decreased in width, has no lateral projection that would injure the rider and is available at a reduced cost.

FEATURES OF THE INVENTION

The saddle of the present invention is characterized by a bearing portion provided on the saddle and having a curved surface, a support portion provided on a seat pillar and having curved surface, the curved surfaces being curved longitudinally of the saddle and conforming to each other, the bearing portion and the support portion being fittable together over the curved surfaces, a threaded rod extending from the curved surface of one of the bearing portion and the support portion through the curved surface of the other portion, and an internally threaded member screwed on the rod for fastening, one of the curved surfaces having the threaded rod extending therefrom or therethrough being formed with a slot extending longitudinally of the saddle and permitting movement of the threaded rod.

FUNCTION OF THE PRESENT DEVICE

When a force is applied to the saddle with the threaded rod loosened to direct its forward end upward or downward, the bearing portion moves along the curved surface of the support portion without displacement of the center of rotation.

When the threaded rod is tightened while the saddle is maintained at the desired angle, the bearing portion is fixed to the support portion, whereby the saddle is completely secured in position at the adjusted angle.

The bearing portion is slidingly movable on the support portion by an amount allowed by the slot in the support portion or the bearing portion. The angle of the saddle is adjustable within this range of movement.

UNIQUE ADVANTAGES OF THE INVENTION

The saddle, which includes none of expensive plated base wires, does not require the expenditure therefor and manual procedure of attaching the base wires and can be made to have a reduced width without limitations.

Furthermore, the present device, which comprises a reduced number of parts, is simple in construction and can be assembled with an improved efficiency.

BRIEF EXPLANATION OF THE DRAWINGS

FIG. 7 is a view in widthwise section showing the saddle of the third embodiment;

FIG. 8 is a view in longitudinal section showing the saddle of the third embodiment;

FIG. 9 is an isometric view showing other examples of seat pillar and support portion;

FIG. 10 is a fragmentary view in section showing a fourth embodiment;

FIG. 11 is a fragmentary view in section showing a fifth embodiment;

DETAILED EXPLANATION OF THE INVENTION

Figure 1:
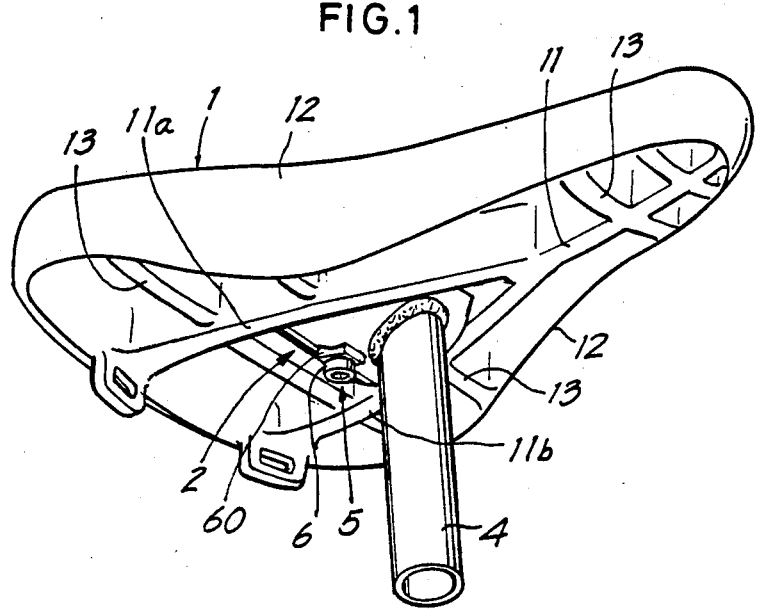
FIG. 1 is an isometric view showing the saddle of a first embodiment.
Figure 2:
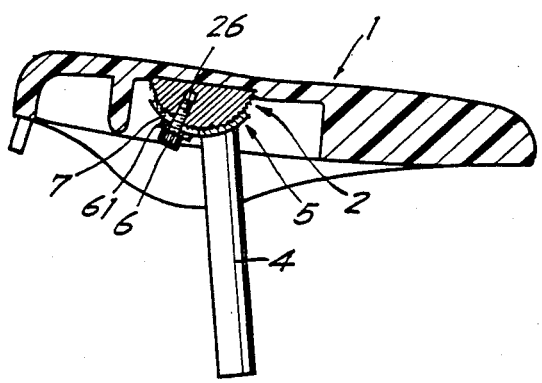
FIG. 2 is a view in longitudinal section showing the saddle of the first embodiment.
Figure 3:
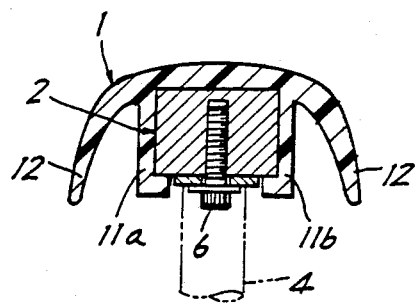
FIG. 3 is a view in widthwise section showing the saddle of the first embodiment.
Figure 4:
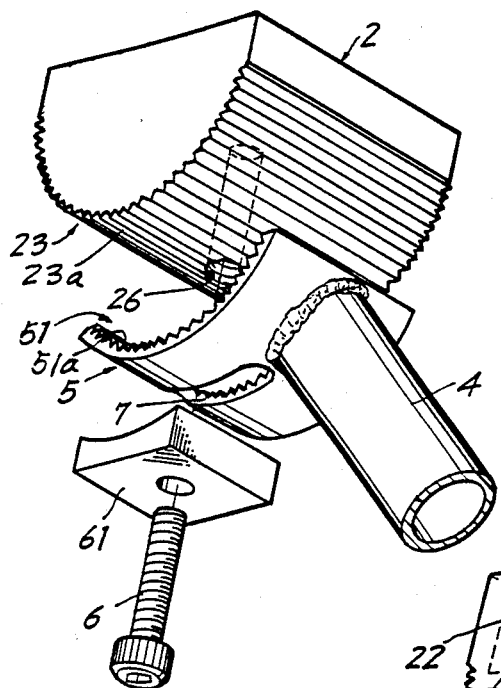
FIG. 4 is an exploded isometric view showing a bearing portion and a support portion of the saddle of the first embodiment.

The present invention will be described below in detail with reference to the embodiments shown in the drawings.

Figure 16:
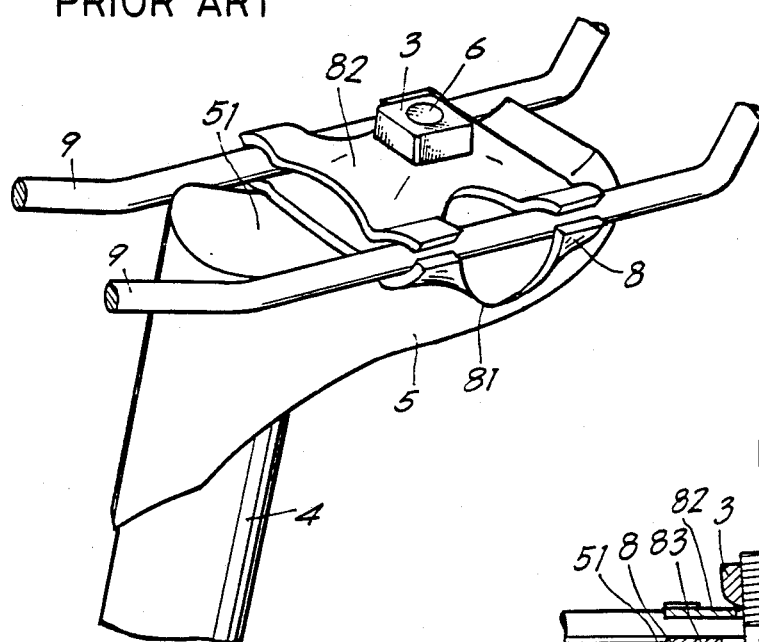
FIG. 16 is a sectional view of a conventional saddle mounting device.
Figure 17:
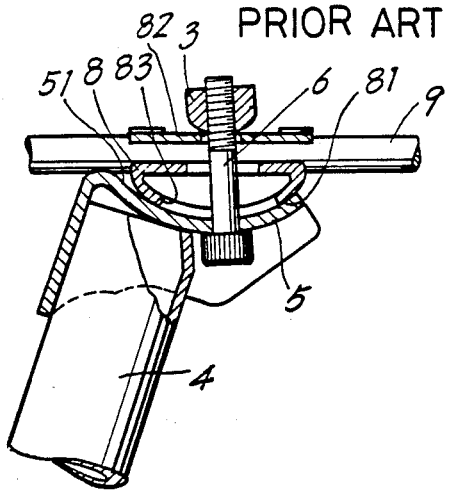
FIG. 17 is a sectional view of the conventional device of FIG. 16.

At the outset, it is helpful to consider a mounting device according to the prior art (FIG. 16 & 17). This type of mounting device comprises a support portion 5 provided on the upper end of the seat pillar 4 and curved longitudinally of the saddle, an intermediate member 8 disposed on the support portion 5 and having a curved surface 81 conforming to the curved surface 51 of the support portion 5, a holding plate 82 placed over base wires 9 on the saddle, a bolt 6 inserted through the support portion 5, the intermediate member 8 and the holding plate 82, and a nut 3 on the nut for tightening up the assembly.

The intermediate member 8 has a bore hole 83 which is in the form of a slot extending longitudinally of the saddle. When the bolt is loosened, the intermediate member 8 is slidable along the curved surface 51 of the support portion 5 to alter the angle at which the base wires 9 clamped between the intermediate member 8 and the holding plate 82 are held to the pillar, whereby the saddle angle is freely adjustable.

Although mounting devices of this kind were less likely to injure the rider since the nut 6 was not exposed, and used a reduced number of parts, base wires were still utilized. The presence of base wire limited the ability to reduce the width of the saddle and increased the cost of equipment and labor for building the saddle.

FIRST EMBODIMENT (shown in FIG. 1 to FIG. 4)

Turning now to a first embodiment of the present invention, a saddle base 1 is made of a rigid synthetic resin and integrally formed on its lower side with a main rib 11 extending from the forward end of the base toward the rear end thereof and bifurcating at an intermediate portion and with auxiliary ribs 13 interconnecting the side walls 12 of the base 1 and the main rib 11. A bearing portion 2 is provided between the bifurcate walls 11a, 11b of the main rib 11. The bearing portion 2, which is made of aluminum or like light alloy, has a planar upper surface and a lower surface outwardly curved longitudinally of the saddle base in the form of a semicircle having a radius of curvature of about 30 mm.

The bearing portion 2 is secured in the base 1 by insert molding, with its top embedded in the bottom side of the saddle base 1 and with its opposite sides embedded in the bifurcate walls 11a, 11b of the saddle base 1. The bearing portion 2, which is joined to the saddle base 1 by insert molding in the above embodiment, can alternatively be secured to the bifurcate walls 11a, 11b by bolting, or by welding if the base 1 is made of metal.

A curved surface 23 of the bearing portion 2 is provided with anti-slip means 23a formed by furrows and ridges of small width which extend perpendicular to the curving direction and are arranged alternately closely. The bearing portion 2 is further formed in its curved side 23 with a threaded bore 26 which serves as an internally threaded member for having screwed therein the bolt 6 to be described below.

A support portion 5 in the form of a plate for supporting the bearing portion 2 is welded to and extends rearward from the upper end of a seat pillar 4. The support portion 5 is so curved as to extend along the curved surface 23 of the bearing portion 2 and has a curved surface 51 facing the bearing portion 2 and provided with anti-slip means 51a which mesh with the anti-slip means 23a of the curved surface 23 of the bearing portion 2.

The support portion 5 has approximately in its center a slot 7 extending longitudinally of the saddle. A washer 61 is fitted to the lower side of the support portion 5. The bolt 6 extends through the washer 61 and the support portion 5 and is screwed into the threaded bore 26 of the bearing portion 2.

The angle of the saddle can be adjusted by loosening the bolt 6, disengaging the anti-slip means 51a of the support portion 5 from the anti-slip means 23a of the bearing portion 2 and inclining the forward end of the saddle base 1 upward or downward to a desired angle. This rotates the bearing portion 2 along the curved surface 51 of the support portion 5 without displacing the center of rotation. The bolt 6, when tightened, brings the anti-slip means 23a, 51a of the bearing portion 2 and the support portion 5 into meshing engagement with each other, firmly fastening the two members together again. It is also possible to make the support portion 5 integral with the seat pillar 4 by pressing an end of a pipe to a flat form and cutting out and bending the flat end as shown in FIG. 9.

Figure 5:
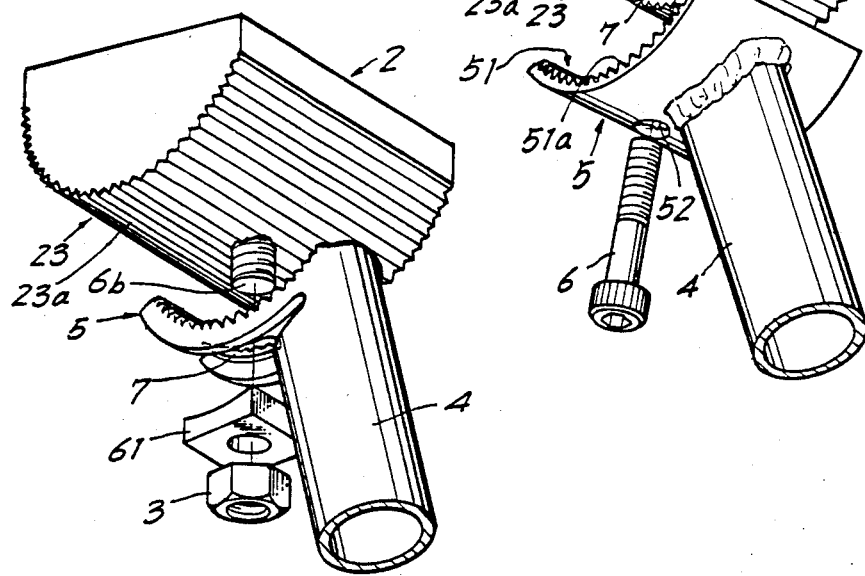
FIG. 5 is an exploded isometric view showing a second embodiment.

SECOND EMBODIMENT (shown in FIG. 5)

In the same manner as in the first embodiment, a bearing portion 2 is secured to a saddle base. A threaded rod 6b extends downward from the center of the bearing portion. The threaded rod 6b is fitted in a slot 7 in a seat pillar 4, and the assembly is fastened with a washer 61 and a nut 3.

Figure 6:
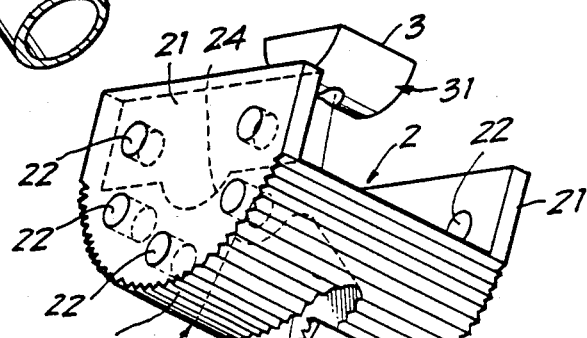
FIG. 6 is an exploded isometric view showing a third embodiment.

THIRD EMBODIMENT (shown in FIG. 6 to FIG. 8)

A bearing portion 2 has upward projections 21, 22 at its opposite ends. The opposite ends including the projections 21 are embedded in bifurcate walls 11a, 11b, (FIG. 7) of a saddle base 1 and thereby secured to the base. To reinforce the joints between the bearing portion 2 and the saddle base 1 and to render the saddle lightweight, holes 22 are formed in the projections 21 and opposite ends of the bearing portion 2 and are filled with resin.

The upper side of the bearing portion 2 and the lower side of the saddle base 1 define therebetween an insertion space 10 for a fastening nut 3 to be described below. The bearing portion 2 is formed in its upper side with a circular arc groove 24 conforming to a curved surface 23 on its lower side. A slot 7 elongated longitudinally of the saddle is formed approximately in the center of the bearing portion 2 therethrough. The slot 7 is fanned out toward the curved surface 23 longitudinally of the saddle.

A hole 52 is formed in a circular arc support portion 5 attached to a seat pillar 4. A bolt 6 is upwardly inserted through the hole 52 and the slot 7 of the bearing portion 2 and screwed in the fastening nut 3 disposed in the space 10 between the bearing portion 2 and the lower side of the saddle base 1 to detachable fasten the support portion 5 and the bearing portion 2 together.

The nut 3 is formed on its lower side with a circular arc surface 31 conforming to the shape of the circular arc groove 24 in the bearing portion 2 and is slidably fitted in the groove 24. When the bolt 6 is loosened, the bearing portion 2, accordingly the saddle base 1, is angularly adjustable by an amount allowed by the slot 7 of the bearing portion 2.

FOURTH EMBODIMENT (shown in FIG. 10)

This embodiment includes a bearing portion 2 and a nut 3 which are the same as those of the third embodiment. A support portion 5 is in the form of a stepped cylinder including a lower small-diameter part 53 which is secured to the upped end of a seat pillar 4. The support portion 5 includes an upper larger-diameter part 54 which is approximately equal to the seat pillar 4 in outside diameter and which is formed on its upper side with a curved surface 51 conforming to the curved surface 23 of the bearing portion 2. The curved surface 51 is provided with anti-slip means 51a in mesh with those of the bearing portion 2.

From the lower end of the seat pillar 4, a bolt 6 is inserted through an axial bore 52 of the support portion 5. The bolt 6 is further inserted through the slot 7 of the bearing portion 2, and the assembly is fastened by the nut 3 in the same manner as already described.

When adjusting the angle of the saddle, the seat pillar 4 is removed from the seat tube of the bicycle frame, and the bolt 6 is loosened and tightened by an elongated turning tool inserted into the seat pillar 4 from its lower end.

FIFTH EMBODIMENT (shown in FIG. 11)

This embodiment includes a bearing portion 2 and a nut 3 which are the same as those of the third embodiment. A threaded rod 6a extends from the upper end of a seat pillar 4 concentrically therewith. A thick annular support portion 5 is rotatably fitted around the threaded rod 6a. A curved surface 51 having the same anti-slip means 51a as already described is formed on the upper side of the support portion 5.

The threaded rod 6a can be screwed into the nut 3 by turning the seat pillar 4, with the rod 6a inserted through the slot 7 of the bearing portion 2. When adjusting the angle of the saddle, the seat pillar 4 is removed from the seat tube of the bicycle frame and then reversely turned to loosen the threaded rod 6a and thereby disengage the bearing portion 2 from the support portion 5. The angle of the seat pillar 4 is then freely variable.

Figure 12:
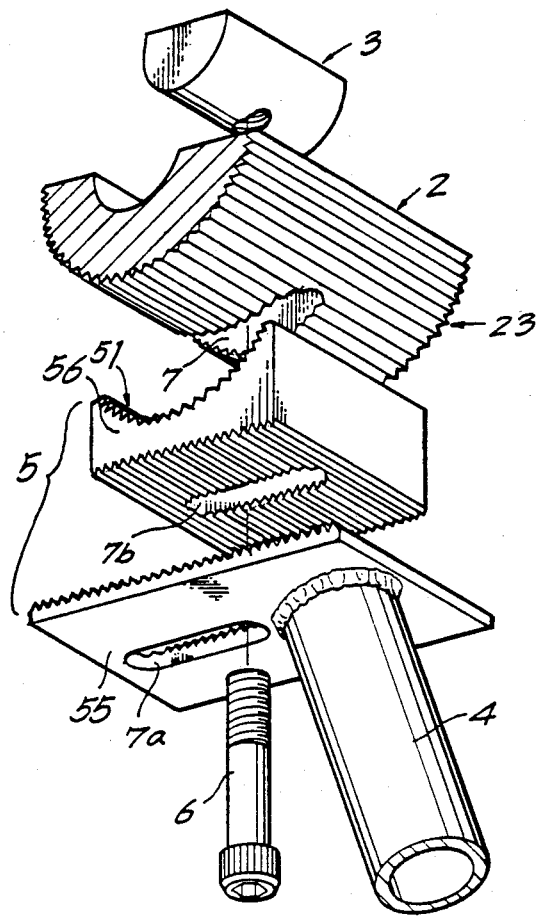
FIG. 12 is an exploded isometric view showing the bearing portion and support portion of a sixth embodiment.
Figure 13:
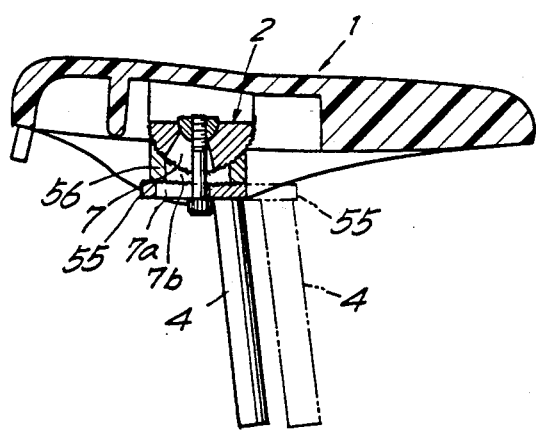
FIG. 13 is a view in longitudinal section showing the sixth embodiment.

SIXTH EMBODIMENT (shown in FIG. 12 and FIG. 13)

The bearing portion 2 and the nut 3 of the embodiment are the same as those of the third embodiment shown in FIG. 6. The bearing portion 2 has a slot 7. A support portion 5 comprises a support portion main body 55 in the form of a planar plate secured to the upper end of a seat pillar 4, and an auxiliary plate 56 clamped between the main body 55 and the bearing portion 2 and having on its upper side a curved surface 51 conforming to the curved surface 23 of the bearing portion 2. Slots 7a, 7b, extending longitudinally of the saddle are formed in the main body 55 and the auxiliary plate 56. The upper side of the main body 55 and the lower side and curved upper side of the auxiliary plate 56 are each provided with anti-slip means formed by ridges and furrows extending perpendicular to the slot 7a and arranged closely.

A bolt 6 is inserted through the slots 7a, 7b, 7 of the support portion main body 55, the auxiliary plate 56 and the bearing portion 2 and screwed in the nut 3. The angle of the saddle is, of course, adjustable by loosening the bolt 6, while the position of the saddle is adjustable longitudinally thereof by longitudinally shifting the auxiliary plate 56 relative to the main body 55 as indicated in broken lines in FIG. 13. The slot 7b for inserting the bolt through the auxiliary plate 56 can be a hole which is shaped otherwise.

Figure 14:
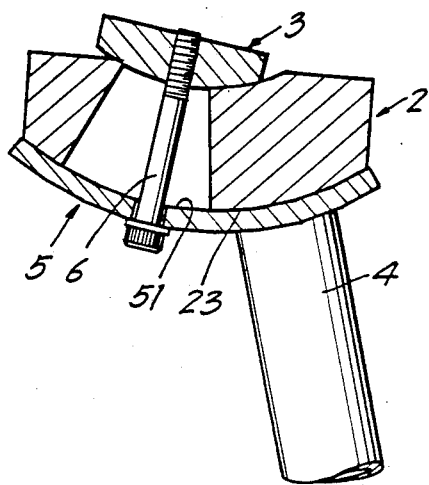
FIG. 14 is a fragmentary view in section showing a seventh embodiment.

SEVENTH EMBODIMENT (shown in FIG. 14)

While the bearing portions 2 and the support portion 5 of the first to sixth embodiments have precisely circular curved surfaces, the seventh embodiment has curved surfaces which are polygonal in cross section. The curved surfaces 23, 51 of the bearing portion 2 and the support portion 5 have obtuse angles approximate to 180 degrees at the angles formed at adjacent polygonal surfaces.

In this case, the bearing portion and the support portion are restrained from rotation by contact between the angular parts of the curved surfaces, so that the curved surfaces 23, 51 need not be provided with furrows or ridges serving as anti-slip means.

Figure 15:
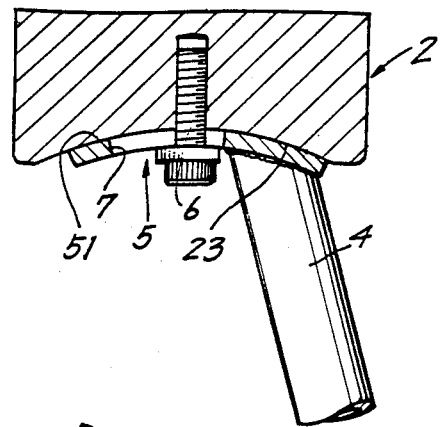
FIG. 15 is a fragmentary view in section showing an eighth embodiment.

EIGHTH EMBODIMENT (shown in FIG. 15)

The curved surfaces 23, 51 of the bearing portion 2 and the support portion 5 in any of the first to seventh embodiments are so curved that the central parts thereof are away from the saddle base 1, whereas the eighth embodiment has a bearing portion 2 with an inwardly curved surface 23 and a support portion 5 with a bulged curved surface 51 in reverse relation to the foregoing embodiments. Although the support portion shown in FIG. 15 has a slot 7, this is not limitative; the structures of the first to seventh embodiments are, of course, usable.

With the embodiments wherein the curved surfaces 23, 51 of the bearing portion 23 and the support portion 5 are curved precisely in the form of a circle, the anti-slip means 23a, 51a formed by furrows and ridges on the curved surfaces can be dispensed with, and yet the saddle can be satisfactorily retained in position against angular displacement and will not slip even if acted on, for example, by the weight of the rider, unless the saddle is subjected to a high impact.

The present invention is not limited to the foregoing structures but can, of course, be modified variously within the technical scope set forth in the claims.

I claim:

1. An angle-adjustable saddle for a cycle, comprising:
a bearing portion having projections at both sides thereof to be embedded directly in a saddle base and having a lower curved, bulging, surface extending longitudinally of the saddle base defining an insertion space between a lower surface of the saddle base and an upper surface of said bearing portion, a slot formed in said bearing portion and extending longitudinally of the saddle base, a support portion provided at an upper end of a seat pillar of the cycle and having formed on its upper side a curved surface conforming to said curved surface of said bearing portion and having a hole formed therein, a fastening nut disposed in the insertion space and rotatably supported on an upper surface of said bearing portion, and a threaded rod being insertable through said hole in said support portion and said slot in said bearing portion and adapted to be screwed into said fastening nut for detachably fastening together said bearing portion and said support portion with said curved surfaces thereof fitted to each other.

2. The saddle as defined in claim 1 wherein said support portion comprises a support portion main body in the form of a planar plate and secured to the seat pillar and an auxiliary member clamped between said support portion main body and said bearing portion and a slot and a threaded rod inserting hole are formed in said support portion main body and said auxiliary member, respectively.

3. The saddle as defined in claim 1 wherein said curved surfaces of said support portion and said bearing portion are respectively provided with anti-slip means formed by furrows and ridges extending perpendicular to the curving direction and arranged alternately.

* * * * *